US008191160B2

(12) United States Patent
Juneau

(10) Patent No.: US 8,191,160 B2
(45) Date of Patent: May 29, 2012

(54) METHOD AND SYSTEM FOR AUDITING AND CORRECTING AUTHORIZATION INCONSISTENCIES FOR RECEPTION EQUIPMENT IN A CONTENT DELIVERY NETWORK

(76) Inventor: Rene Juneau, Thornhill (CA)

( * ) Notice: Subject to any disclaimer, the term of this patent is extended or adjusted under 35 U.S.C. 154(b) by 526 days.

(21) Appl. No.: 10/964,621

(22) Filed: Oct. 15, 2004

(65) Prior Publication Data

US 2005/0108529 A1 May 19, 2005

Related U.S. Application Data

(60) Provisional application No. 60/511,791, filed on Oct. 16, 2003.

(51) Int. Cl.
*H04L 29/06* (2006.01)

(52) U.S. Cl. ........................................................ 726/28

(58) Field of Classification Search ..................... 726/28
See application file for complete search history.

(56) References Cited

U.S. PATENT DOCUMENTS

| 4,461,032 A | 7/1984 | Skerlos |
| 4,510,623 A | 4/1985 | Bonneau et al. |
| 4,975,951 A | 12/1990 | Bennett |
| 5,146,496 A | 9/1992 | Westerfer et al. |
| 5,224,161 A | 6/1993 | Daniel et al. |
| 5,251,324 A * | 10/1993 | McMullan, Jr. ................ 725/14 |
| 5,438,620 A | 8/1995 | Ryan et al. |
| 5,485,518 A | 1/1996 | Hunter et al. |
| 5,621,793 A | 4/1997 | Bednarek et al. |
| 5,828,402 A | 10/1998 | Collings |
| 5,859,874 A | 1/1999 | Wiedeman et al. |
| 5,867,226 A | 2/1999 | Wehmeyer et al. |
| 5,880,769 A | 3/1999 | Nemirofsky et al. |
| 5,905,859 A * | 5/1999 | Holloway et al. ................ 726/22 |
| 5,970,206 A | 10/1999 | Yuen et al. |
| 6,009,116 A | 12/1999 | Bednarek et al. |
| 6,011,973 A | 1/2000 | Valentine et al. |
| 6,035,037 A | 3/2000 | Chaney |
| 6,057,756 A | 5/2000 | Engellenner |
| 6,067,440 A * | 5/2000 | Diefes ............................. 725/27 |

(Continued)

FOREIGN PATENT DOCUMENTS

JP 2000-244284 A 9/2000

(Continued)

OTHER PUBLICATIONS

U.S. Appl. No. 10/575,908, filed Jul. 21, 2006, Notice of Allowance mailed Jan. 25, 2011, 10 pages.

(Continued)

*Primary Examiner* — Michael S McNally
(74) *Attorney, Agent, or Firm* — Kilpatrick Townsend & Stockton LLP

(57) ABSTRACT

A method and system for auditing unauthorized usage in a subscriber content delivery network is described. The method and system includes identifying an indicator relating to accessibility for a receiver intended for receiving signals through the network; obtaining an indicator relating to authorization for a pre-determined service offering of the network; and determining whether the indicator of access ability is consistent with the indicator relating to authorization to thereby ascertain that the receiver is capable of engaging in unauthorized usage. The method and system may optionally include undertaking an action to change at least one of the indicator of access ability and the indicator relating to authorization.

41 Claims, 6 Drawing Sheets

U.S. PATENT DOCUMENTS

| | | | |
|---|---|---|---|
| 6,154,206 A * | 11/2000 | Ludtke | 713/168 |
| 6,177,931 B1 | 1/2001 | Alexander et al. | |
| 6,381,747 B1 | 4/2002 | Wonfor et al. | |
| 6,389,538 B1 * | 5/2002 | Gruse et al. | 713/194 |
| 6,553,413 B1 * | 4/2003 | Leighton et al. | 709/219 |
| 6,754,908 B1 | 6/2004 | Medvinsky | |
| 7,028,335 B1 | 4/2006 | Borella et al. | |
| 7,519,811 B1 | 4/2009 | Hara | |
| 7,530,108 B1 | 5/2009 | Cocchi et al. | |
| 2002/0021665 A1 | 2/2002 | Bhagavath et al. | |
| 2002/0087663 A1 | 7/2002 | Chou et al. | |
| 2002/0092015 A1 | 7/2002 | Sprunk et al. | |
| 2002/0104083 A1 | 8/2002 | Hendricks et al. | |
| 2003/0018445 A1 | 1/2003 | Vince et al. | |
| 2003/0097657 A1 | 5/2003 | Zhou et al. | |
| 2004/0055010 A1 | 3/2004 | Fries et al. | |
| 2004/0123329 A1 | 6/2004 | Williams et al. | |
| 2004/0194124 A1 | 9/2004 | Medvinsky | |
| 2005/0055709 A1 * | 3/2005 | Thompson | 725/30 |
| 2006/0053279 A1 | 3/2006 | Coueignoux | |
| 2006/0259984 A1 | 11/2006 | Juneau | |
| 2007/0076872 A1 | 4/2007 | Juneau | |

FOREIGN PATENT DOCUMENTS

| | | | |
|---|---|---|---|
| WO | WO 02-054765 A1 | 7/2002 | |

OTHER PUBLICATIONS

U.S. Appl. No. 10/575,908, filed Jul. 21, 2006, Office Action dated May 11, 2010, 50 pages.

U.S. Appl. No. 11/422,249, filed Jun. 5, 2006, Office Action dated Jun. 19, 2009, 14 pages.

U.S. Appl. No. 11/422,249, filed Jun. 5, 2006, Final Office Action dated Mar. 25, 2010, 17 pages.

U.S. Appl. No. 11/422,249, filed Jun. 5, 2006, Advisory Action dated Jul. 12, 2010, 3 pages.

U.S. Appl. No. 11/422,249, filed Jun. 5, 2006, Office Action dated Sep. 2, 2010, 15 pages.

\* cited by examiner

METHOD AND SYSTEM FOR AUDITING AND CORRECTING AUTHORIZATION INCONSISTENCIES FOR RECEPTION EQUIPMENT IN A CONTENT DELIVERY NETWORK

This application claims the benefit of U.S. Provisional Application No. 60/511,791 filed Oct. 16, 2003.

FIELD OF INVENTION

This invention relates generally to auditing of unauthorized signal usage of a receiver in a content delivery network, and more particularly to the detection and prevention of inconsistencies in authorizations for content and services distributed by way of wired or wireless networks to subscriber receiving devices.

BACKGROUND OF THE INVENTION

In a typical distribution system of signals in a content delivery network, such as for cable or satellite television, there are various components that reside on a single physical system or on separate systems linked by one or more communication networks. Such content delivery networks may include content providers which provide content delivered across the network, such as audio, video, data, applications, or combinations thereof.

In a content delivery network, the content is typically provided by content providers into the content delivery network as one or more signals. Such signals are typically encoded to prevent unauthorized access and use of the signal. Receivers, such as digital television receiver units, receive from the network and use such encoded signals for use by users. A receiver typically includes a decode function so that receivers may make use of the encoded signals it receives from the content delivery network. A content delivery network also typically includes a conditional access system connected to the network, which controls the content that any particular receiver may access and use. The conditional access system typically operates in conjunction with the receivers to control the content that any one receiver may access and use. A receiver typically perform checks with the conditional access system to determine the particular content that it is permitted to receive and use, and then decode only such authorized content.

The content delivery network will also typically contain other systems such as subscriber management systems for maintaining and billing customer subscriptions, pay-per-view, video-on-demand, interactive television and other systems which may in turn have records or subsystems used for controlling access to services, features or content, which may be directly or indirectly related to the conditional access system.

Access to various services available on the network is typically controlled through authorizations entered into the subscriber management system. Individual subsystems may in turn have records relating to individual receiver service authorizations. Such records of authorization may in one form or another be duplicated on various systems, and each system may independently exert control over access to the related service or signal.

Furthermore, a conditional access system or and other systems with service or signal authorization records may not necessarily provide facilities for a large number of content providers to enter authorizations or to manage billing and other customer-oriented functions. Likewise, conditional access systems known in the art may not provide interfaces or functions for the handling of large volumes of transactions except through a connection to a subscriber management system. Where such facilities may be provided within a conditional access system, network operators may not be accustomed to using them, as they may not provide convenient or easily usable interfaces, and they may not include logging and other audit trail mechanisms.

Additional background details regarding content delivery networks, conditional access systems, and technologies deployed therein are described in various U.S. patents.

| | |
|---|---|
| 4,461,032 | to Skerlos |
| 4,510,623 | to Bonneau et al. |
| 5,146,496 | to Westerfer et al. |
| 5,224,161 | to Daniel et al. |
| 5,880,769 | to Nemirofsky et al. |
| 5,970,206 | to Yuen et al. |
| 6,067,440 | to Diefes |
| 5,485,518 | to Hunter et al. |
| 5,828,402 | to Collings |
| 5,438,620 | to Ryan et al. |

Some conditional access systems known in the art have been compromised in a manner that allows for unauthorized usage of content signals. Methods of compromising these systems include deliberate or accidental operational errors, exploitation of design or operational flaws in the systems, and "hacking" or reverse-engineering of the systems.

Detection of unauthorized access and usage may often be rendered difficult, as a compromised receiver may not have a method of communicating back with the conditional access system, or the return communication means may be disabled on the compromised receiver.

Correction of conditional access problems may also be a lengthy process, with compromised (also known as "pirated") systems sometimes remaining in operation for several years, with a succession of counter-measures and counter-counter-measures being deployed respectively by the content delivery network operators and hackers.

Operational errors, software or hardware problems or other sources of errors may cause discrepancies to occur between subscriber management systems, conditional access systems and other systems such as video-on-demand servers. In such a cases, it may be possible for a receiver to access a service or signal which the network operator does not intend to authorize for that receiver.

There is a need for a system and method for identifying and reconciling differences within various authorization systems to control unauthorized access to signals and services.

SUMMARY OF THE INVENTION

In accordance with an aspect of the present invention, a method for auditing unauthorized usage in a subscriber content delivery network is provided. The method comprises the steps of: identifying an indicator relating to accessibility in respect of a receiver intended for receiving signals through the network; obtaining an indicator relating to authorization for a pre-determined service offering of the network; and determining whether the indicator relating to accessibility is inconsistent with the indicator relating to authorization to thereby ascertain that the receiver is capable of engaging in unauthorized usage.

The indicator relating to accessibility may be evidence that the receiver has been procured by a network operator of the network, and the indicator relating to authorization may be evidence that the receiver is not authorized for usage of the pre-determined service offering of the network. The evidence that the receiver is not authorized may be an absence of indicia that the receiver is authorized for usage of the pre-determined service offering of the network. Further, the evidence that the receiver is not authorized may be obtained from a subscriber management system controlling access of the receiver to receive the signals through the network. Still further, the evidence that the receiver is not authorized may be obtained with a conditional access system controlling access of the receiver to receive the signals through the network. The evidence that said receiver is not authorized may obtained from any one of a video-on-demand service, a pay-per-view service, an impulse pay-per-view service, an advertising management service, and an interactive television system.

The indicator relating to accessibility may be evidence that the receiver is connected to the network, and the indicator relating to authorization may be evidence that the receiver is not authorized for usage of the pre-determined service offering of the network. The evidence that the receiver may be connected to the network includes an indication of the receiver responding to a transmission through the network. The evidence that the receiver may be not authorized is an absence of indicia that the receiver is authorized for usage of the pre-determined service offering of the network. The evidence that the receiver is not authorized may be obtained from a subscriber management system controlling access of the receiver to receive the signals through the network. The evidence that the receiver is not authorized may also be obtained from a conditional access system controlling access of the receiver to receive said signals through said network. The evidence that the receiver may be connected to the network and the evidence that the receiver is not authorized is obtained from any one of a video-on-demand service, a pay-per-view service, an impulse pay-per-view service, and an interactive television system.

The indicator relating to accessibility may be evidence that the receiver is using a signal through the network associated with the pre-determined service offering, and the indicator relating to authorization may be evidence that the receiver is not authorized for usage of the pre-determined service offering of the network. The evidence that the receiver is using a signal through the network may include an indication of communication between the receiver and a network server offering the pre-determined service offering to subscribers of the network. The evidence that the receiver is not authorized may be an absence of indicia that the receiver is authorized for usage of the pre-determined service offering of the network. The evidence that the receiver is not authorized may be obtained from a subscriber management system controlling access of the receiver to receive the signals through the network. The evidence that the receiver is not authorized may be obtained with a conditional access system controlling access of the receiver to receive the signals through the network. At least one of the evidence that the receiver is connected to the network and the evidence that the receiver is not authorized may be obtained from any one of a video-on-demand service, a pay-per-view service, an impulse pay-per-view service, an advertising management, and an interactive television system.

If the indicator relating to accessibility is inconsistent with the indicator relating to authorization, a corrective action may be executed to address the inconsistency between the indicator relating to accessibility and the indicator relating to authorization.

Each of the indicator relating to accessibility and the indicator relating to authorization may be retrieved from a record of any one of the receiver, a conditional access system in communication with the network, a subscriber management system in communication with the network, a video-on-demand system in communication with the network, a pay-per-view system in communication with the network, an impulse pay-per-view system in communication with the network, and an interactive television system in communication with the network, and the corrective action may update the record to cause the indicator relating to accessibility to be consistent with the indicator relating to authorization.

The corrective action may include disabling at least one functional capability of the receiver. The corrective action may also includes launching a legal action against any alleged user of the receiver. Further, the corrective action may be executed in an automated manner. Still further, the corrective action may be executed at a time tending to minimize disruption of operation of the network.

The corrective action may include recording into a report information identifying: a) the receiver, b) the indicator relating to accessibility and c) the indicator relating to authorization. The report may be utilized to take at least one further corrective actions. The use of the report may be performed by a party other than the party which performed the recording into the report.

In another aspect of the present invention, a method for detecting unauthorized signal receivers in a subscriber content delivery network is provided. The method comprises the steps of: a) identifying receivers that are capable of receiving a subscriber signal delivered by the network; b) identifying receivers that are authorized to receive the subscriber signal delivered by the network; and where each of the receivers identified in step a) is not one of the receivers identified in step b), further identifying every each of the receivers as being a potentially unauthorized signal receiver.

The method may further comprise: d) disabling each of the receivers from receiving the subscriber signal delivered by the network.

A conditional access system may be in communication with the network and each of the receivers, access by each of the receivers to the subscriber signal delivered by the network may be controlled by the conditional access system, and disabling each of the receivers may include the conditional access system refusing further access by each of the receivers to the subscriber signal in response to each of the receivers being identified being a potentially unauthorized signal receiver.

Disabling each of the receivers may include at least one command being sent over the network to the each of the receivers to disable at least one capability of the each of the receivers.

The step of identifying receivers that are capable of receiving a subscriber signal may include identifying receivers which have previously been authorized and subsequently de-authorized for receiving the subscriber signal delivered by the network. Further, the step of identifying receivers that are capable of receiving a subscriber signal may include identifying receivers having records associated therewith indicating use at the receivers of the subscriber signal. Still further, the step of identifying receivers that are capable of receiving a subscriber signal may include identifying receivers having records associated therewith indicating that payment was made by users of the receivers to obtain authorization for use at the receivers of the subscriber signal.

The method may further comprise taking legal action against at least one alleged user of each of the receivers.

BRIEF DESCRIPTION OF THE DRAWINGS

The foregoing and other aspects of the invention will become more apparent from the following description of specific embodiments thereof and the accompanying drawings which illustrate, by way of example only, the principles of the invention. In the drawings, where like elements feature like reference numerals (and wherein individual elements bear unique alphabetical suffixes).

DETAILED DESCRIPTION OF EMBODIMENTS

Figure 1:
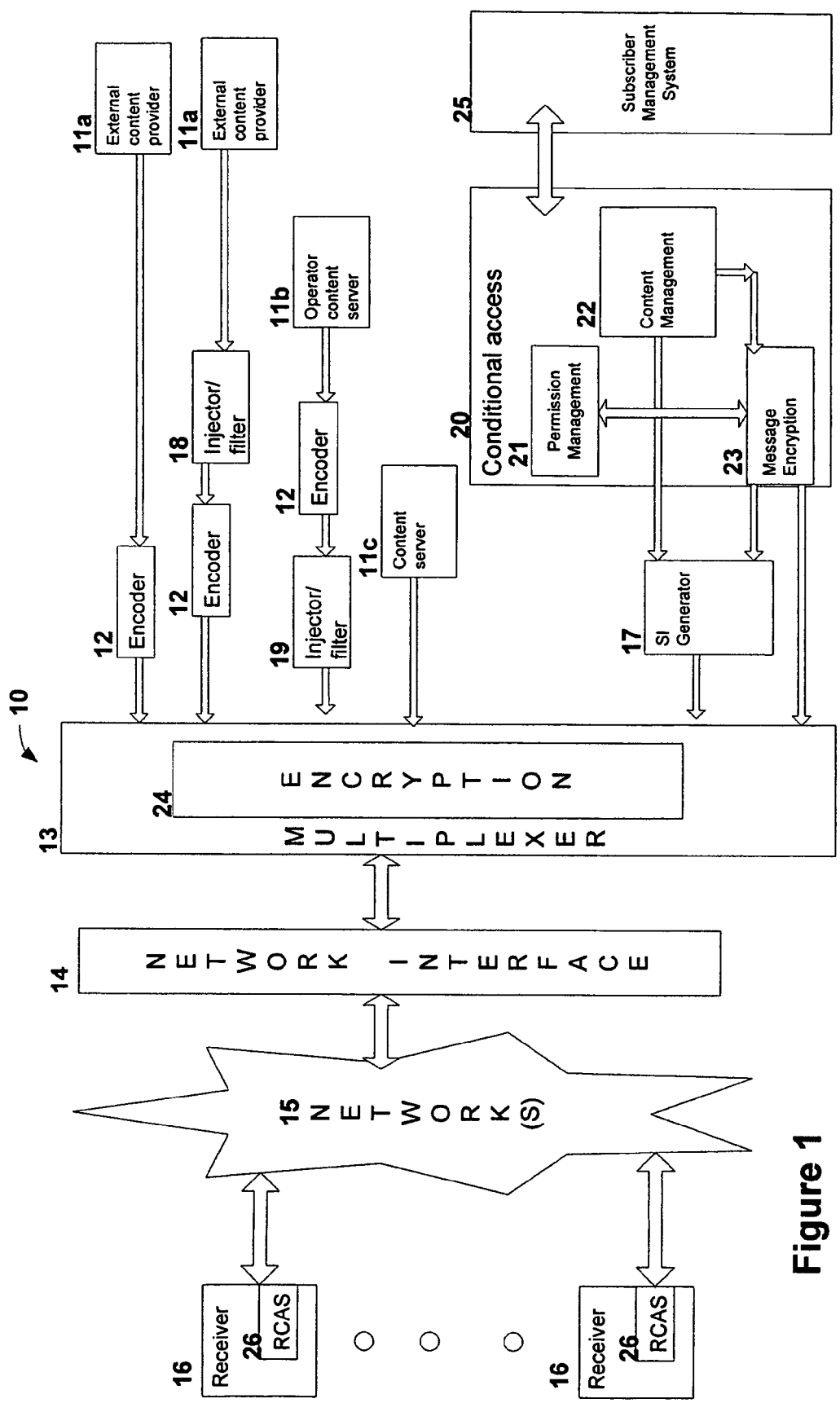
FIG. 1 is a block diagram illustrating functional components of a content delivery network.

The description which follows and the embodiments described herein are provided by way of illustration of an example, or examples, of particular embodiments of the principles of the present invention. These examples are provided for the purposes of explanation, and not limitation, of those principles and of the invention. In the description, which follows, like parts are marked throughout the specification and the drawings with the same respective reference numerals.

According to one embodiment of the present invention, there is provided a method and system for detecting the possibility of unauthorized signal usage or service authorization configuration in a wireless or wired signal distribution environment. A method provided by the embodiment may be used to determine whether unauthorized usage of signals may be taking place, or whether or not a receiver configuration within authorization and related systems is consistent with properly authorized or unauthorized receivers. The embodiment may take further steps to confirm whether or not unauthorized usage has occurred. Additionally, whether or not unauthorized usage has occurred, the embodiment may take steps to prevent unauthorized usage from taking place and to correct authorization configurations.

Referring to FIG. 1, a content delivery network 10, such as for digital cable or satellite television, is described. The content delivery network 10 will hereafter be referred to network 10. The following details of the embodiments are mainly focused upon delivery of signals associated with television, but it will be appreciated that other content may be delivered in other embodiments.

Components of the network 10 may reside on a single physical system or on separate systems linked by one or more communication networks. Multiple instances of each component may also be required. Network 10 may include a plurality of content providers 11a to 11c for the content being delivered therein, such as external content providers 11a and internal content sources 11b, which are acquired or stored by the network operator. The content may consist of audio, video, data, applications, or any combination thereof. Depending on conditional access control as described below, the content is made available to receivers 16 in network 10 as determined by an operator of network 10 or by request from a user of receiver 16. The content may be broadcast or transmitted on a point-to-point, point-to-multipoint or other basis as is known in the art.

Examples of content streams include television signals with audio, video, closed captioning and interactive applications that may be embedded into a composite signal, as is the case with a television signal supporting the Wink™ or WebTV™ interactive television specifications. Content streams may also be a series of separate digital transport streams for audio, video, interactive television, and conditional access.

A given instance of content may be shared by one or more services. For example, an English language service may be defined as containing a given video stream and an English-language audio stream. A Spanish service may be defined using the same video stream and a Spanish-language audio stream. In this manner, only the bandwidth of one video stream is used on network 10 while two separate channels may be provided on a program guide.

Content may be received in a format that is compatible with the network 10, or may require processing before transmission within network 10. Examples of processing include compression and encoding for video and audio signals, format conversion, and encryption or the signals. Content may also be available from one or more content servers 11c operated by the operator of network 10. Content from content providers 11a to 11c may be transmitted in real-time, or slower or faster than real-time for purposes of caching content for deferred viewing at receiver 16 or other downstream device.

Content from content providers 11a to 11c may flow into encoders 12 which process the content prior to distribution to a multiplexer 13. Alternatively, for content that is already encoded, it may flow directly into multiplexer 13. Content from multiplexer 13 may then be delivered through a network interface 14 to communication network 15 for delivery to a plurality of receivers 16. The function of multiplexer 13 varies with the network and content type, and format of the content. Examples of multiplexers 13 that may be used include MPEG-2 multiplexers, asynchronous transfer mode (ATM) packet switches, gigabit Ethernet devices, and other similar systems known in the art.

Network 10 may provide multiple facilities for communication between receivers 16 and other components of network 10. As examples, on a cable television network, bandwidth may be allocated separately for content transmission, control signal transmission, and return communication from a receiver 16 with all communication occurring on the same cable. On a satellite television system, the content and control signals are transmitted over the satellite, while receiver 16 may communicate back to components of network 10 through a telephone connection.

Along with content from content providers 11a to 11c, various forms of data may be transmitted to aid the viewer in the use of a multi-channel, multi-service system. This type of information, which can include the electronic program guide and related tables for access, frequency and other information for receiving and describing the signal, are referred to as service information (SI) tables. SI tables may be produced and transmitted by SI generator 17, and may also include various forms of control information from external sources to control access for content such as subscription services and pay-per-view movies, and other forms of information the content of which may be used by receiver 16. Signal enhancements such as station logos, data, and other forms of content may be included with the content from the various sources, may be added to or removed from signal associated with the content by injector/filter 19 that may be performed before or after the encoding process. As an example, injector/filter 19 is shown in FIG. 1 as performing signal enhancements after the encoding process of content from operator content server 11b.

Security and authorization of receiver 16 to use signals in network 10 may be provided by a conditional access system 20 (CA). CA 20 controls which content a particular receiver 16 is authorized to access. Services and functions provided by CA 20 include, among other things, permission management 21 for control of authorizations of a per user or receiver basis, content management 22 for controlling access to content, message encryption 23 facility to secure the communication authorization and other messages for transmission. CA 20 operates in conjunction with content encoder 12 for protecting of the content during transmission from unauthorized access, and a receiver conditional access system 26 (RCAS) at receivers 16 for communication with CA 20. RCAS 26 may include local secure storage of permissions and other content access information. Content encoder 12 may perform various transformations on all or part of the content signal to prevent unauthorized access, including signal modification, encryption, and other methods as is known in the art.

Subscription control of CA 20 may be managed by entering service authorization and cancellation commands on a subscriber management system (SMS) 25. SMS 25 forwards subscription control requests to CA 20, which may then generate the appropriate commands and operations to deliver subscription control commands in the form and manner required to be accepted by a receiver 16.

With respect to communication network 15, for a typical cable television system, communication network 15 may be a system of amplifiers, transmitters, re-transmitters, copper cable, fiber optic systems, switches and routers used for distribution of a signal in communication network 15, as is known in the art. In a cable television network, receivers 16 are connected to communication network 15 and may communicate back with an operator of communication network 15 using Internet, DAVIC (Digital Audio Video Council, Geneva, Switzerland), other command protocols supported by the communication network 15, or a combination of such protocols.

Other examples of communication network 15 include DTH (direct to home) satellite, microwave multichannel multipoint distribution service (MMDS), local multipoint distribution system (LMDS) television distribution system, DSL (Digital Subscriber Loop) and its various high-speed variants such as VDSL (as used, for example, by telephone companies for high-speed data and video transmission), ATM (Asynchronous Transfer Mode) networks, cellular telephone and other communication networks for transferring data as is known in the art.

Figure 2:
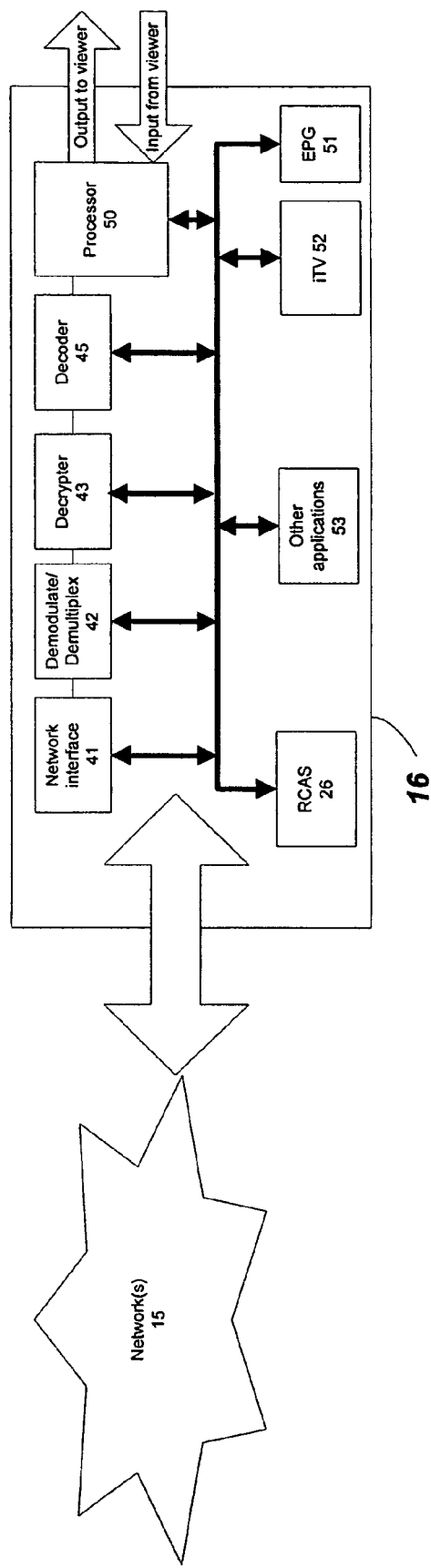
FIG. 2 illustrates the functional components of a receiver of the network of FIG. 1.

Referring to FIG. 2, some of the functional components of receiver 16 that may be found in typical digital television applications on network 10 are shown. Components of receiver 16 may be implemented in hardware or software, and individual or groups of functions may be provided by separate applications communicating through an operating system or other shared facility, or may be part of a single application, as is known in the art.

Receiver 16 includes one or more network interfaces 41 for communication to and from communication network 15. In an embodiment for a television receiver, network interfaces 41 may consist of one or more tuners to receive a signal from communication network 15, and a modulator or a telephone modem for returning data to communication network 15. Receiver 16 may further include demodulate/demultiplex function 42 to convert modulated signals received from network 15 into digital data, and extract the desired data from the signal stream. A decrypter function 43 performs decryption functions on the signals, and is typically controlled by RCAS 26 for controlling unauthorized use and access. The decryption of decrypter function 43 may be based on analog or digital means of preventing unauthorized access to the signal. Within receiver 16, decoder 45 transforms the signal's decrypted bits into a content format required by a user to receiver 16, such as a television viewer. For example, decoder 45 may convert the bits from MPEG digital audio and video bit streams into analog television signals.

RCAS 26 may typically be included in receiver 16 which controls the content that may be accessed and used at receiver 16. Examples of control mechanisms include channel subscription authorizations received from CA 20, and pay-per-view purchases made at receiver 16. In some embodiments, RCAS 26 can determine whether access is allowed through its own locally stored parameters, or by making an authorization check with CA 20. RCAS 26 may also provide additional functions for implementing or controlling the decryption process by decrypter 43 such as controlling the reception and processing of data, or providing decryption keys or other information required for controlling the decryption or access processes at receiver 16.

One or more processors 50 may be used to implement the functions of receiver 16 or to provide or control communication between the various functions of receiver 16. The functions and facilities of receiver 16 may further be controlled by an operating system and one or more software modules that executes on the one or more processors 50.

Other functions that may be available on receiver 16 can include an electronic program guide (EPG) 51 to allow a user to list, select and obtain other information on the content available; an interactive television (iTV) subsystem 52 to provide facilities for executing other applications such as games, viewer response gathering and other functions. These iTV applications may operate in conjunction with television programs received at receiver 16, or independently as separate services. System applications 53 include system configuration, audience measurement, advertising management delivery and others functionality. Advertising management systems may include systems for presenting or substituting advertisements, and presenting advertisements in a targeted manner based on viewing habits, user demographics or other criteria. Advertising management system may also include the ability to capture usage data such as time and date of channel viewing. Applications such as EPG 51 and the other applications may in turn be iTV applications that use the facilities of iTV subsystem 52. In the embodiment, system applications 53 may also include capabilities for exercising some control over what may be viewed through receiver 16, such as parental control and copy protection. These applications may in turn require additional processing of an accessed signal by network components that may be implemented in one or more of the injector/filters 18 or 19, content spooler 11c, CA 20, SI Generator 17, or component, data or other signal information.

Multiple instances of each functional component may be available on a particular receiver 16. Thusly, simultaneous processing of multiple signals is possible, and the ability to handle different signal types is also provided. Examples include the ability to process multiple television signals at a time for picture-in-picture functions, to record one program while watching another on a receiver equipped with a personal video recorder (PVR) feature, and to receive analog and digital signals.

Functions and applications may be provided and managed in multiple ways on receiver 16. The applications may be part of the software provided with receiver 16, and included with receiver 16 when it is shipped to a user or updated software thereon after the user has put receiver 16 in use. Additionally, one or more separate binary applications may be transmitted separately to receiver 16 through communication network 15. Further, interpreted applications may be executed within an iTV environment. The iTV applications may be considered separate content provided in network 10, or may be included with video or other content as optional enhancements. Transmission of an application may be managed as a separate content stream or as a component of another content instance such as video program.

In alternate embodiments, receivers 16 may include any and all of the following operating alone or in combination: digital set-top cable and satellite receivers; integrated components within digital televisions; personal computers with appropriate network connections; cellular telephones and personal digital assistants (PDAs) connected through wireless networks, or computer network hook-ups; and gaming consoles. Such receivers 16 typically rely on CA 20 having one or more capabilities similar to those used in television transmission, including satellite and other digital radio systems, mobile telephones using chip-card technology, and mobile or home devices and related services for receiving music, video or other content that receive content either directly from a network or indirectly through a computer such as the iPod™ music player and iTunes™ music service.

Receivers 16 may have the ability to receive software updates and applications through communication network 15. In television and other receivers, these applications do not necessarily require interaction with the user, as they may execute in the background without the user's knowledge or during the receiver off state.

Receivers 16 may also include one or more application execution environment to receive and execute scripts or compiled or interpreted applications. Examples include various Java™ systems such as Personal Java™, Java TV™ and others, as implemented in computers, web browsers and other devices. For embodiments receiving television signals, application execution environments of receiver 16 include iTV products and specifications such as WebTV™ and MSN™TV services, the Wink™ and OpenTV™ systems, and specifications such as DVB-MHP from the DVB Project, and OCAP (Open Cable Application Platform) from the Society of Cable Telecommunications Engineers (SCTE), and others. Other applications, such as an EPG, an audience measurement application, an advertising management system, or others may be implemented as applications within an application execution environment, or may include an application execution environment which may provide similar capabilities to an iTV system for running interactive or background applications. Additional systems with similar capabilities for receiver 16 are known in the art.

In an embodiment for distribution of television signals in network 10, whether using analog, digital or a combination of both technologies, network 10 and receiver 16 typically rely on the encryption and access control components provided in network 10 and CA 20. Such components control receivers 16 that have access to particular content and signals in network 10, whether in the form of specific viewing channels, program selections, or other features available to the subscriber such as interactive applications. Examples of these security systems that may be implemented include the Simulcrypt specifications developed by the DVB Project, Geneva, Switzerland, conditional access systems and smart cards from Nagravision SA, Cheseaux, Switzerland, and NDS Group plc, Middlesex, UK, and the conditional access subsystems of the DigiCipher™ II products from Motorola, Inc., Schaumburg, IL, and the PowerVu™ products from Scientific-Atlanta, Inc. Lawrenceville, Ga. Other systems for controlling or facilitating access have been implemented, which systems include applications for parental control methods such as the V-Chip technology offered by Tri-Vision International LTD, Toronto, Canada, the electronic program guide (EPG) products offered by Gemstar-TV Guide International, Inc., Los Angeles, Calif., and video copy protection products from Macrovision Corporation, Santa Clara, Calif.

As previously described, security and authentication of access may be provided by CA 20 and other components at the site of the operator of network 10 (such as encoders 12) and within receivers 16, as described above with reference to FIGS. 1 and 2.

CA 20 communicates authorizations to access and use signals to RCAS 26 located on each receiver 16. Receiver 16, RCAS 26, or a component or subsystem peripheral to RCAS 26 such as a smart card, typically has one or more identifiers. These identifiers, alone or in combination, may identify receiver 16 in network 10, and may be used by CA 20 or other systems to communicate with and send authorization commands to RCAS 26 or other components or subsystems of receiver 16. These authorizations are typically based on transmitting one or more authorizations periodically to a receiver 16; upon receiver 16 requesting a list of authorized services from CA 20; or, for services such as pay-per-view movies, on a credit scheme where the credit is transmitted to or provided with receiver 16 and the credit is reduced through usage of pay-per-view content at receiver 16. In a credit scheme, the credit may be based on a financial amount (dollars), a number of tokens or other methods that are known in the art. The credit may be provided by SMS 25 that may be separately accessed by a user of receiver 16 (such as by telephone orders to SMS 25). In such an embodiment, the authorization request and related credit information to is provided by SMS 25 to CA 20 for processing and transmission to receiver 16. Examples of SMS 25 include systems such as those provided by DST Innovis, Inc., El Dorado Hills, Calif., CSG Systems, Incorporated, Englewood, Co., and others.

Content servers 11*a*, 11*b* and 11*c* (referred to hereafter generally as content server 11, or CS 11) may include servers for video-on-demand (VOD), pay-per-view (PPV), impulse pay-per-view (IPPV), applications such as interactive television (iTV), or other forms of content or services. Authorization for use of these services is typically enabled through SMS 25, with actual control of the services handled either directly by the server or a related server access control component, or through a system providing access control services such as CA 20. For example, SMS 25 may pass VOD authorization commands for specific receivers 16 to CA 20. CA 20 may then in turn forward authorization messages to a VOD server, or may periodically pass a full list of authorized receivers 16 to a VOD server. Other methods for managing and propagating authorizations will be known to those of skill in the art.

An authorization sequence for service access in television distribution systems as described above is typically based on an operator's entry of the authorization to an SMS 25. The SMS 25 then generates one or more commands which are sent from the SMS 25 to the CA 20 system or other CS 11, based on an agreed protocol and a set of commands between SMS 25 and CA 20 or CS 11. The CA 20 or CS 11 may in turn use the commands from SMS 25 to generate one or more commands and send them to the RCAS 26 or other component or subsystem in receiver 16, or to another component that has a measure of control over service usage such as a CS 11 or subsystem thereof. The communication and format of commands between instances of CA 20, CS 11, RCAS 26 or other receiver components typically differs from the format and protocol of commands sent between the SMS 25 and the CA 20 or CS 11.

This process can result in multiple separate contexts for the authorizations of a receiver 16, including:
- the records that may stored within the SMS 25
- the records that may stored within the CA 20
- the records that may stored within the RCAS 26 of the receiver 16
- the records that may be stored within other components or subsystems of the receiver 16, such as an EPG or VOD component
- the records that may be stored within various instances or subsystems of CS 11.

Inconsistencies may develop between these multiple contexts, wherein the authorization status of a subscriber may not be synchronized among the SMS 25, CA 20, CS 11, RCAS 26 and other receiver subsystems. Receivers 16 which, according to the records of SMS 25, have no current authorization for one or more services may be found in operation with the ability to use signals or services for which, according to the records of SMS 25, the receivers 16 are not authorized to process.

Detection of unauthorized usage is often rendered difficult, as a compromised receiver 16 may not have a method of communicating back with the operator, the return communication means of the receiver 16 may be disabled, or functions simply may not be available for a receiver 16, CA 20 or CS 11 system to report on the available subscriptions or to reconcile subscriptions between the components.

System operators typically tend to not have means to practically remedy this problem because:
- CA 20, SMS 25 and CS 11 systems may not have the capability to reconcile authorizations with a receiver 16 or with each other, or may have deficiencies in their reconciliation systems;
- CA 20 and CS 11 systems may not have interfaces or automated systems in place to allow either manual or automated reconciliation of receiver 16 authorizations;
- Reconciling receivers 16 on a manual basis from SMS 25 may result in significant operator costs. Usage of SMS 25 systems may result in separate charges from the vendor of SMS 25 for account creation to access the receivers 16 and for each transaction sent to receiver 16;
- Manual entry is prone to errors, which could result in unintended disabling of in-service receivers 16;
- The authorization inconsistencies may be the result of improper or unauthorized use of the SMS 25, CA 20 or CS 11 systems, in which case manual use of either system could result in detection and disruption or circumvention of the corrective measures being applied.

In the embodiment, a method is provided for identifying and correcting receiver authorization inconsistencies, and, where unauthorized usage can be identified as having occurred or having the potential to occur, taking measures to correct or prevent the unauthorized usage.

Figure 3:
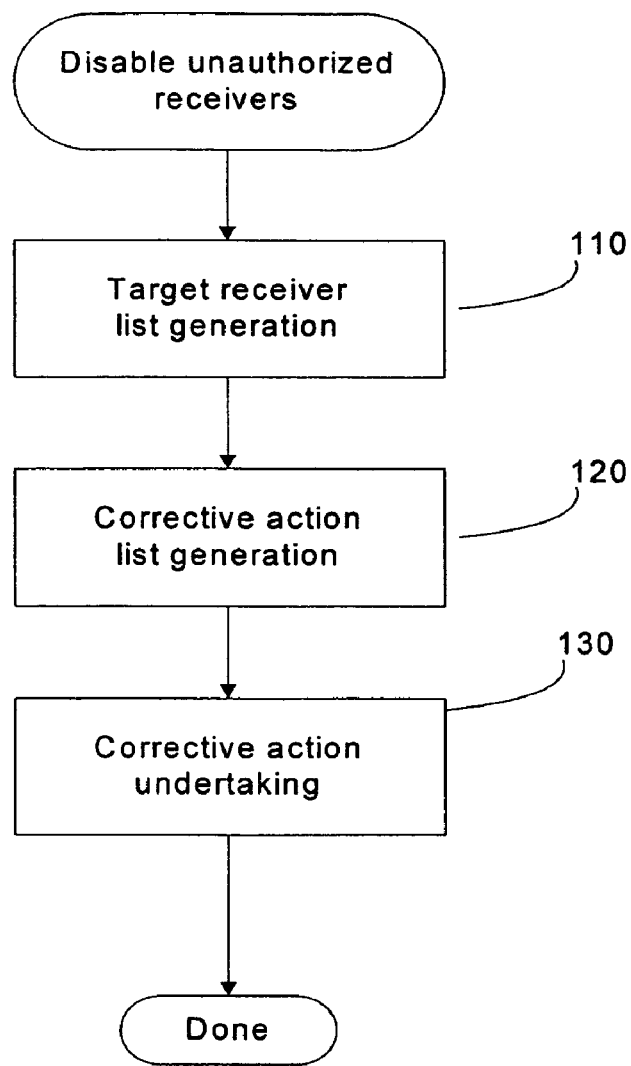
FIG. 3 is a flow diagram of a method of the steps for identifying and correcting potential unauthorized receiver usage in the network of FIG. 1.

Referring to FIG. 3, a flow-chart of a method of the embodiment for auditing and correcting unauthorized usage in network 10 is shown. Briefly, the steps of the method include target receiver list generation 110, corrective action list generation 120, and corrective action undertaking 130.

Figure 4:
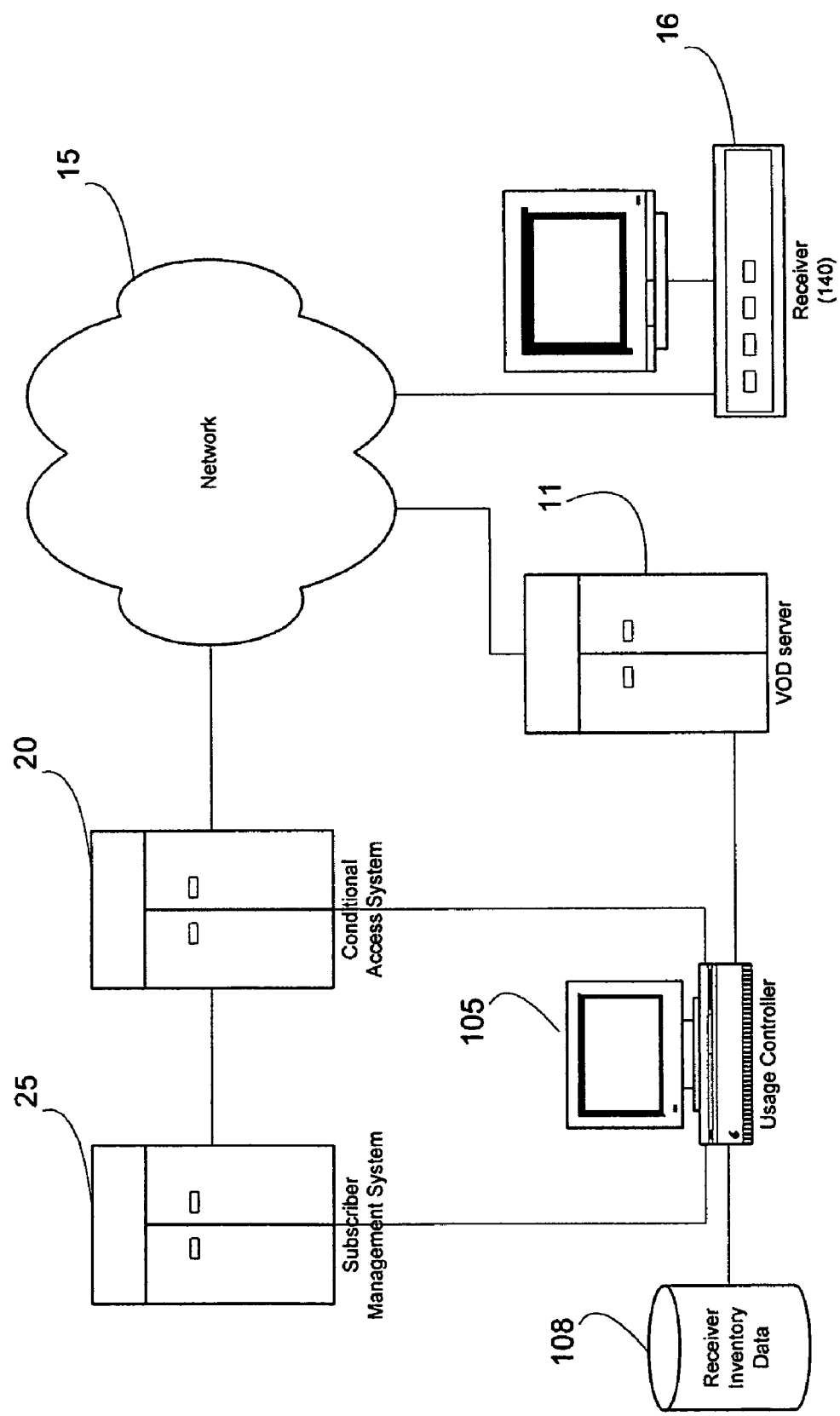
FIG. 4 is a block diagram of network components of a system for identifying and correcting potential unauthorized receiver usage in the network of FIG. 1.

FIG. 4 illustrates in a block diagram the functional components of the embodiment. In the embodiment, the method detects potential authorization inconsistencies for a receiver 16 by way of comparing authorization characteristics 100 of the receiver 16 as recorded as stored within CA system 20, SMS system 25, another server such as a VOD server shown in the figure as a content server CS 11a, 11b or 11c, other sources such as data source 108, or combinations thereof The characteristics 100 may be obtained directly or indirectly by a controller function 105 from anyone of or combinations of the various sources.

In an embodiment, characteristics 100 include an indicator relating to accessibility in respect of a receiver 16 that is intended for receiving signals in network 10. An indicator relating to accessibility may be, for example, evidence that the receiver 16 is connected to or communicating with network 10, or evidence that receiver 16 is using one or more signals in received through network 10 that may or may not be related to a service offering of network 10. Evidence of receiver 16 being connected to network 10 may be, for example, receiver 16 responding to a poll or "ping" request in network 10. In some situations, evidence of the mere existence of receiver 16, such as determined from the procurement records of an operator of network 10, may be sufficient as an indicator relating to accessibility.

Characteristics 100 may also include an indicator relating to authorization for a pre-determined service offering of network 10. A service offering may be, for example, a subscriber signal offered to users connected to network 10 through receivers 16, such as a television signal, or other services from a pay-per-view service, impulse pay-per-view service, video on demand service, advertisement management system service, or an iTV service, as described in greater detail above and below. In some situations, evidence that receiver 16 is not authorized for usage of a pre-determined service offering of network 10 may be an indication that receiver 16 is not authorized for any service offering of network 10.

Figure 5A:
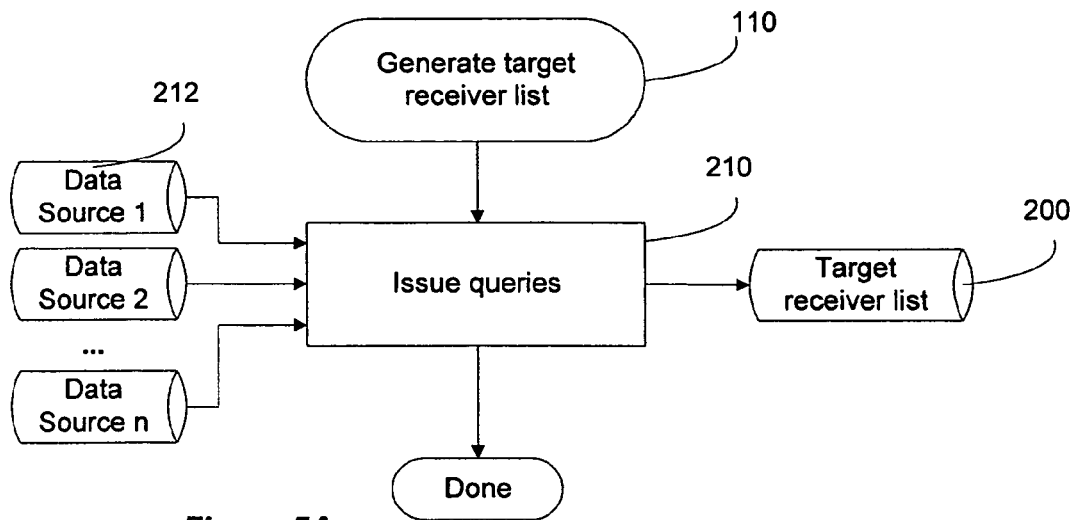
FIG. 5A is a flow diagram for directly generating a target receiver list for the method of FIG. 3.
Figure 5B:
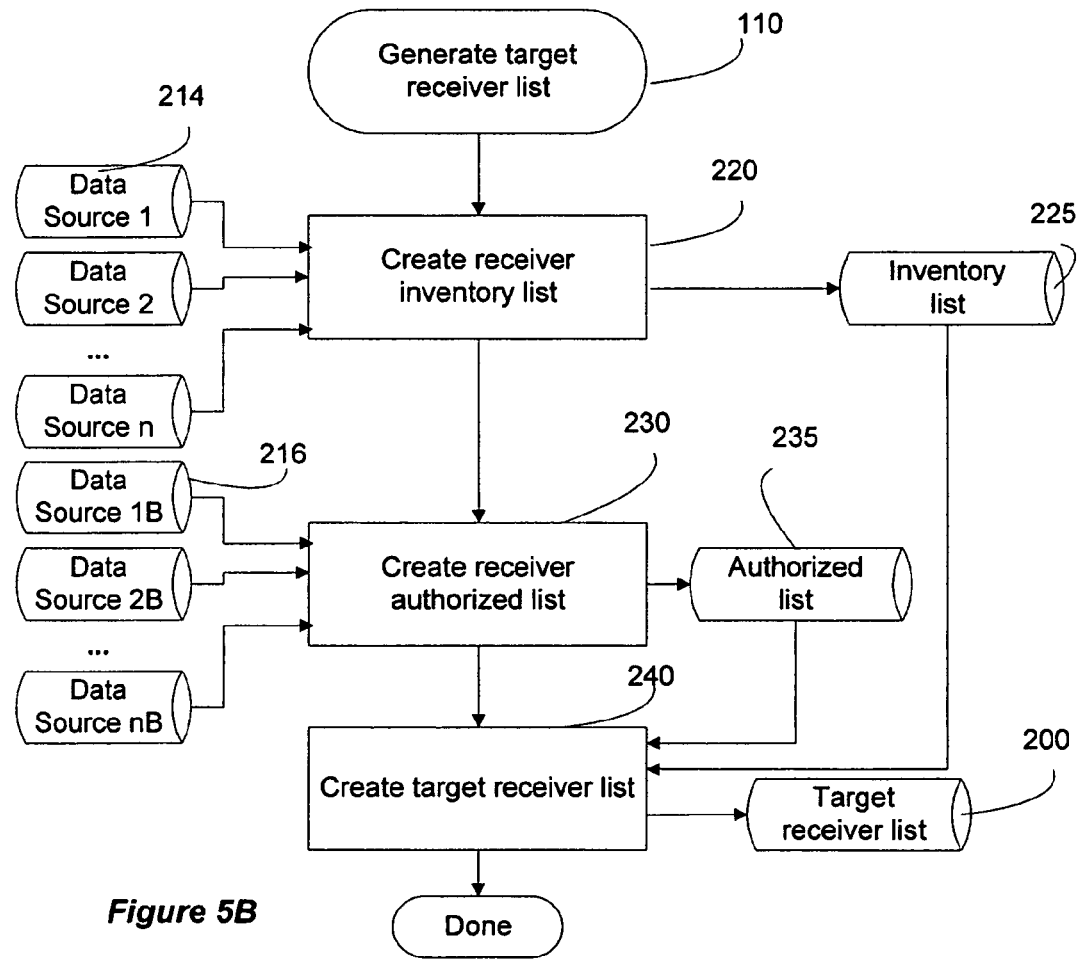
FIG. 5B is a flow diagram for generating a target receiver list for the method of FIG. 3 based on generating an inventory list and an authorized list.

Referring to FIGS. 5A and 5B, flow-charts are shown to elaborate step 110 of FIG. 3 for the generation of a target receiver list 200. Briefly, the steps of the method include the acquisition of two or more characteristics 100 from a variety of data sources, and comparing the values of the characteristics 100 to one or more expected combinations of characteristics to determine if inconsistent authorizations may exist for the receiver 16. In an embodiment, it is determined whether a characteristic 100, such as relating to an indicator relating to accessibility, is inconsistent with another characteristic 100, such as relating to an indicator relating to authorization. From the determination, it can be ascertained whether receiver 16 is capable of engaging in unauthorized usage.

FIG. 5A shows a variety of data sources 212 from which receiver and respective characteristics 100 associated with receiver 16 can be obtained. In step 210, one or more queries are issued against data sources 212 to directly generate target receiver list 200.

The information required for obtaining and creating target receiver list 200 may be available in a single system, or through a system which can access multiple systems as if these were a single system. In such a case, a single query can be designed to directly create target list 200 by applying one or more search criteria within a query against one or more data sources. In such a case, an embodiment may generate target receiver list 200 by examining if a particular receiver 16 has two or more indicia associated with it which, in combination, are not consistent with the receiver 16 being authorized in network 10 for at least one service offering of network 10.

In one embodiment, CA system 20 is a source of data 212. Within a CA system 20, a receiver 16 with channel authorizations may also have an indication that the receiver 16 is authorized within the SMS 25. The characteristics 100 are therefore whether or not the receiver 16 has authorizations, and whether or not the receiver 16 is known by CA 20 to be authorized within SMS 25. A query to generate the target list 200 may consist of identifying receivers 16 with channel authorizations that are not active on SMS 25. If the information is available from a single source such as the CA system 20, a single query could create the target list 200. In the following example where the information of receiver 16 is in table receiver_table, receivers 16 are identified by a field receiver_id, the channel authorizations are set in field channel_auth, and the SMS activation is determined by a field SMS_active being set to 1:

```
SELECT receiver_id FROM receiver_table
    WHERE channel_auth IS NOT NULL
    AND SMS_active <> 1
```

Taking the example further, the SMS_active field and channel_auth field may be in separate tables on separate databases, respectively identified in the following example as tables receiver_sms and receiver_auth. These table names could represent database and table combinations, views on tables or database, or other mechanisms as would be known to those of skill in the art. The tables may be respectively located on the SMS 25 and CA 20. The controller may contain one or more database or data access tools that allow data sources from multiple systems to be usable from a query operation. An SQL query against these multiple tables could take a form such as:

```
SELECT receiver_id FROM receiver_sms, receiver_auth
    WHERE receiver_sms.receiver_id = receiver_auth.receiver_id
    AND channel_auth IS NOT NULL
    AND SMS_active <> 1
```

In other cases, multiple queries, a hierarchy of queries or single queries with multiple selection criteria may be required from one or more sources to create the target list 200. Additional data and query structures or fields may be used to map the receiver_id fields from the tables, as known to those of skill in the art.

FIG. 5B illustrates an alternate embodiment where the data is acquired in separate steps. Operational rules or preferences, technical capabilities, physical access restrictions, jurisdictional regulations or other encumbrances may prevent a single process or system from accessing multiple sources of receiver characteristics 100, or from accessing multiple characteristics 100 in a single step from one or more sources. In such a case, multiple steps may be required to obtain the required receiver characteristics 100 and generating target list 200, as exemplified in FIG. 5B.

In FIG. 5B, step 220 creates a first list of receivers 16 based on a first query consisting of one or more queries or other data acquisition methods from one or more systems, databases or other data sources 214 containing information on receivers 16. Such data may be used as evidence of one or more characteristics 100. The first query may be designed to obtain information on all receivers 16, or on all receivers 16 which may have one or more specific characteristics 100. The first list is referred to herein as inventory list 225.

Step 230 then creates a second list of receivers 16 based on a second query consisting of one or more queries or other data acquisition methods, and the second query may be issued against the same data sources as the first query, other data sources, or combinations thereof. Such data may be used as evidence of one or more characteristics 100. The second query is designed to obtain information on all receivers 16 that are known or authorized to have one or more specific characteristics 100, such as, for example, having an indicator relating to authorization for a service offering. The second list is referred to herein as authorized list 235.

Step 240 then creates a target receiver list 200, which is a third list consisting of information on receivers 16 that are in inventory list 225 but that are not in authorized list 235. Target list 235 is therefore a list of receivers 16 that have a combination of characteristics that indicate inconsistent authorizations.

While FIG. 5B shows the sources of data 214 and 216 as separate for steps 220 and 230, any or all of data sources 216 could be the same as any or all of data sources 214, and may in fact be a single source.

In the embodiments described above, CA 20 and SMS 25 were identified as potential sources of data. Other sources of data 212, 214 and 216 for receiver characteristics 100 may include service authorization information, service usage records, communication records or combinations thereof, such as but not limited to:

pay-per-view (PPV) and impulse pay-per-view (IPPV) systems;

video-on-demand (VOD) systems;

interactive television (iTV) systems which may have records of iTV application usage at the receiver 16;

inventory and management systems for controlling receiver 16 distribution;

shipping and purchasing records and other data sources for receivers 16;

records of communication with or data obtained from receivers 16, including usage information viewing records, state information, or combinations thereof. Other sources of receiver 16 information, state and activity will be apparent to those of skill in the art. In other embodiments, other systems with data accessible to the operator of network 10 may be used to obtain records of communication with receivers 16. These include audience measurement systems, targeted advertising systems, and electronic or interactive program guides; and systems or records for managing network components which may control or indicate access to receiver 16, such as tap, network or other connection management systems, as used on cable system to enable or disable the physical connection of the cable to a given household.

It will be appreciated that other sources of receiver characteristics 100 may also be used.

The generation of target list 200 may be based on a variety of characteristics 100. The selection of characteristics may be based on hypothetical or verified inconsistencies in values or settings of characteristics for receivers 16. Variances may occur because of operational errors, system failures and other causes. Combinations of characteristics may be selected based on identifying areas where different systems may allow access to one or more features, even though another system may indicate that access to the same one or more features is forbidden.

In different embodiments, combinations of receiver characteristics 100 may include:

- Indication of activation or usage of a receiver 16 from any system described above when the receiver 16 is not identified within SMS 25, CA 20, inventory or other records as a receiver 16 that is allowed to be authorized on network 10;
- Indication of PPV or IPPV activity or authorization on a receiver 16 within one or more PPV, IPPV, CA 20 or SMS 25 or other system when PPV or IPPV activity is indicated as not permitted on the receiver 16;
- Indication of channel or service authorizations or usage which are not consistent between any two or more of CA 20, SMS 25 or CS 11;
- Indication of channel or service authorizations or usage which are not consistent between any of CA 20, SMS 25, CS 11 or receiver 16 and another parameter that should preclude such authorization from taking place. For example, a separate flag within CA 20 may indicate that services to a receiver 16 is suspended; however, such services may still be associated with the receiver 16 within CA 20 in spite of the suspension. While CA 20 may prevent access for services it controls, a CS 11 system such as a VOD system may not consider the "suspended" flag and still allow VOD access;
- Indication of channel or service usage by a receiver 16 which does not correspond with activation or authorization records within CA 20, SMS 25 or CS 11; and
- Receiver history or activity logs such as records of activation and deactivation of any or all services.

Queries for receiver characteristics 100 may include one or more identifiers used to identify a particular receiver 16. For operational, security or other reasons, the identifier for a receiver 16 as used in SMS 25 may be different from the identifier used for CA system 20 or other system such as an IPPV system to communicate with the receiver 16. Within FIG. 5B, steps 220, 230 or 240 could be accessing sources of data to match two or more receiver identifiers to ensure that step 240 has the appropriate identifier within the target receiver list 200.

In one embodiment, the generation of target receiver commands may generate different commands for different receivers 16 in the target list 200 based on information available on one or all of the receiver 16 type, status, current authorizations and authorization history. For example, in the example just described where the target list 200 is generated based on the prior history of a receiver 16 of authorization for one or more services, the command to be generated may be based on the current authorization status of the receiver 16. A receiver 16 that is no longer shown by SMS 25 to be authorized for such services but that is shown by SMS 25 to be authorized for other services may receive one or more commands to disable the services that are no longer authorized. A receiver 16 that is no longer shown within SMS 25 to be authorized for any services may receive one or more commands to cancel such services, to cancel all services, to disable the receiver 16 or other actions in different implementations of the embodiment.

In some cases, an authorization inconsistency could result in a receiver 16 having less authorizations than expected. In such a case, corrective action could consist of adding services to the receiver 16.

In another embodiment, the creation of target receiver list 200 may be based on one of more indicia about the state of receiver 16. The creating of inventory list 225 may be based on records of communication from receiver 16 to one or more network components. For example, on a cable television system, receivers 16 may transmit a status message to CA system 20 or other network component periodically, or a message, command or signal may be sent to the receiver 16, for which the receiver 16 generates and transmits a response message. As another example, on a satellite television network, a receiver subsystem such as RCAS 26 may use a telephone connection to place a call and communicate with a network component based on a periodic callback scheduling mechanism. Such a call may also be related to pay-per-view management or purchase activity, interactive television usage or other purposes. For any of these examples, the creating of inventory list 225 may be based on obtaining a list of receivers 16 from which one or more forms of communication have been received within a given time period. The creating of authorized list 235 may be based on a list of receivers 16 received from SMS 25 that are currently authorized to receive one or more services. The creation of target receiver list 200 may be by starting with the list of receivers 16 from which communication is known to have been received (the inventory list 225), and removing from this list any receivers 16 that also appear on in the list of receivers 16 that are authorized to receiver one or more services (the authorized list 235). The resulting target list 200 would represent a list of receivers 16 that are known to have communicated with one or more network components, but that should not be communicating as they are not authorized for one or more services.

In other embodiments, the target list 200 may be based on communication with one or more receivers 16 to obtain information about the content being used by user of the receiver 16. The mechanism for obtaining this usage information from the receiver 16 may include:

- The transmission of a process to the receiver 16, such as an interactive television process, to collect and transmit usage information;
- Passing of the current receiver 16 state to obtain one or more records of signal usage. This method may be of use when implemented as part of a software subsystem such as an EPG which already has information such as the current channel being viewed;
- A function call to the operating system or another subsystem within the receiver 16 which can provide access to usage records. An EPG subsystem, an iTV environment, a viewing measurement subsystem or a targeted advertising system would typically have the information and may provide the functions required. Other subsystems may also be capable of providing the functions or data required;
- A memory access to a specific memory or other storage location where the required information is stored;
- Where a server external to receiver 16 receives the channel change request, such as would be the case in a switched environment such as a VDSL system, a process on the server can capture the channel change request or the resulting channel change, or pass the channel change information to another process on the same or another server;
- Periodic polling of receiver 16 or a server component. A process can execute on a server which requests one or more records from receiver 16, or from a server process that has acquired one or more records from receiver 16;
- Requesting or accessing of the viewing records from another system or subsystem within receiver 16 or external to receiver 16 that is used to maintain viewing records, such as a diagnostic subsystem, an audience measurement system, targeted advertising system, electronic program guide software, VOD, PPV or other system. Such system may accumulate records within receiver 16, and may also gather records from receiver 16 for storage on one or more server systems;

Data from a subscriber management or conditional access system that holds limited viewing records reported by receiver 16. For example, a subscriber management system will collect pay-per-view purchase records from receiver 16, either directly or indirectly through conditional access system 20;

Using the data from state information, memory locations, registers or access to functions or features of the operating software or any subsystem of receiver 16 that can provide the current state for features of the receiver 16 that may include information on the content a user is currently or has recently used. Examples of these features include the "previous channel" feature, which, in a television receiver, allows a viewer to go back to the channel that was viewed prior to the current channel being viewed; the picture-in-picture feature, which allows the viewer to view two channels at once; the "previous channel" feature that may be associated with a picture-in-picture feature; the recording function on a personal video recorder (PVR)-equipped receiver, which may be recording from a channel while a viewer is watching another channel. The data from this feature provides access to another viewing record, and may be available through one or more of the methods described above; and Diagnostic data which can be retrieved from a receiver 16.

It will be appreciated that other methods of acquiring usage information may be used in other embodiments.

The steps to create target receiver list 200 may be further refined to reduce the number of receivers 16 within target list 200. Such refinement may consist of removing or including receivers 16 matching one or more criteria, which could include but are not limited to:

Receivers 16 most recently acquired by the operator of network 10, based on their acquisition within a predetermined number of days from the current date. These receivers 16 may be considered to be in the system inventory;

Receivers 16 currently in an operational inventory. These may include receivers in inventory or in transit for customer installation;

Receivers 16 undergoing repair work;

Receivers 16 that are known to have been taken out of service or destroyed;

Receivers 16 used within the operator's facilities which are not included on subscriber management system 25 as they may have been authorized using other means;

Receiver 16 type, to only target specific sets of receivers 16;

Receiver 16 age, to only disable receivers 16 that are in inventory but that have not been authorized in a predetermined amount of time; and Receivers 16 that have a particular history of authorization, such as the addition and later deletion of one or more specific services.

In other embodiments, one or more steps of target receiver list generation may receive update information from their data sources which show only the changes to the inventory since the last time the lists were generated or updated. The creation of target receiver list 200 may be based on these updates in such embodiments.

Turning to step 130 of FIG. 3, once target receiver list 200 has been generated, the network operator of network 10 may create a corrective action list for taking one or more corrective actions. Corrective actions for controlling unauthorized usage in network 10 may take many forms, including automated or manual methods of actions. Prior to the taking of corrective actions, the embodiment may optionally further confirm that one or more receivers 16 on the target receiver list 200 is in fact engaged in unauthorized usage. In some embodiments, such confirmation may include polling each receiver 16 identified by target receiver list 200. Confirmation that a receiver 16 is engaging in unauthorized usage may be identified by, for example, a lack of response from the receiver 16 or information returned from the receiver 16 consistent with unauthorized usage. Evidence of such usage can include communication or response to communication from the receiver 16. Evidence of usage can also involve other indications of activity from other systems which the receiver 16 may communicate with, including VOD systems, PPV systems, iTV systems, the Internet, advertising management systems, software download systems and others. Evidence of usage may point to specific activity, such as usage of a specific channel or content item such a VOD or PPV movie. Some evidence of usage, such as accessing a VOD movie or accessing two separate television channels can be considered specific evidence of a user utilising the receiver 16. The operator of network 10 may consider one or more of these evidence of usage items as unauthorized usage. The operator may consider even the connection of a receiver 16 to the network 10, whether through wired or wireless communication, to be unauthorized usage if the receiver 16 has not been authorized with a subscription by a user to at least one specific service on the operator's network 10.

Corrective actions may also be targeted at a particular receiver 16, at a component of network 10 used to control network access by the receiver 16, or at the user of the receiver 16. Furthermore, corrective action may be selected based on further queries and analysis.

Once generated, the corrective action list may also simply represent a list of target list receivers 16 and the authorization inconsistencies identified for each receiver 16 in the target list 200.

By way of illustration, an example of corrective action list generation is provided below, where a list of receivers 16 which have authorizations to receive a given service "X" within CA 20, but are not authorized to receive the service based on records in SMS 25.

In this example, the operator of network 10 may wish to further investigate usage of the receivers 16 to determine if service X has actually been used by one or more such receivers 16 within the target list 200. As described earlier, it may be possible on a given network 10 with a given receiver 16 to make such a determination as part of the generation of target list 200. However, an operator may, for operational efficiency, network usage, regulatory or other reasons, choose not to verify actual usage of the service until the target list 200 is generated.

Figure 6:
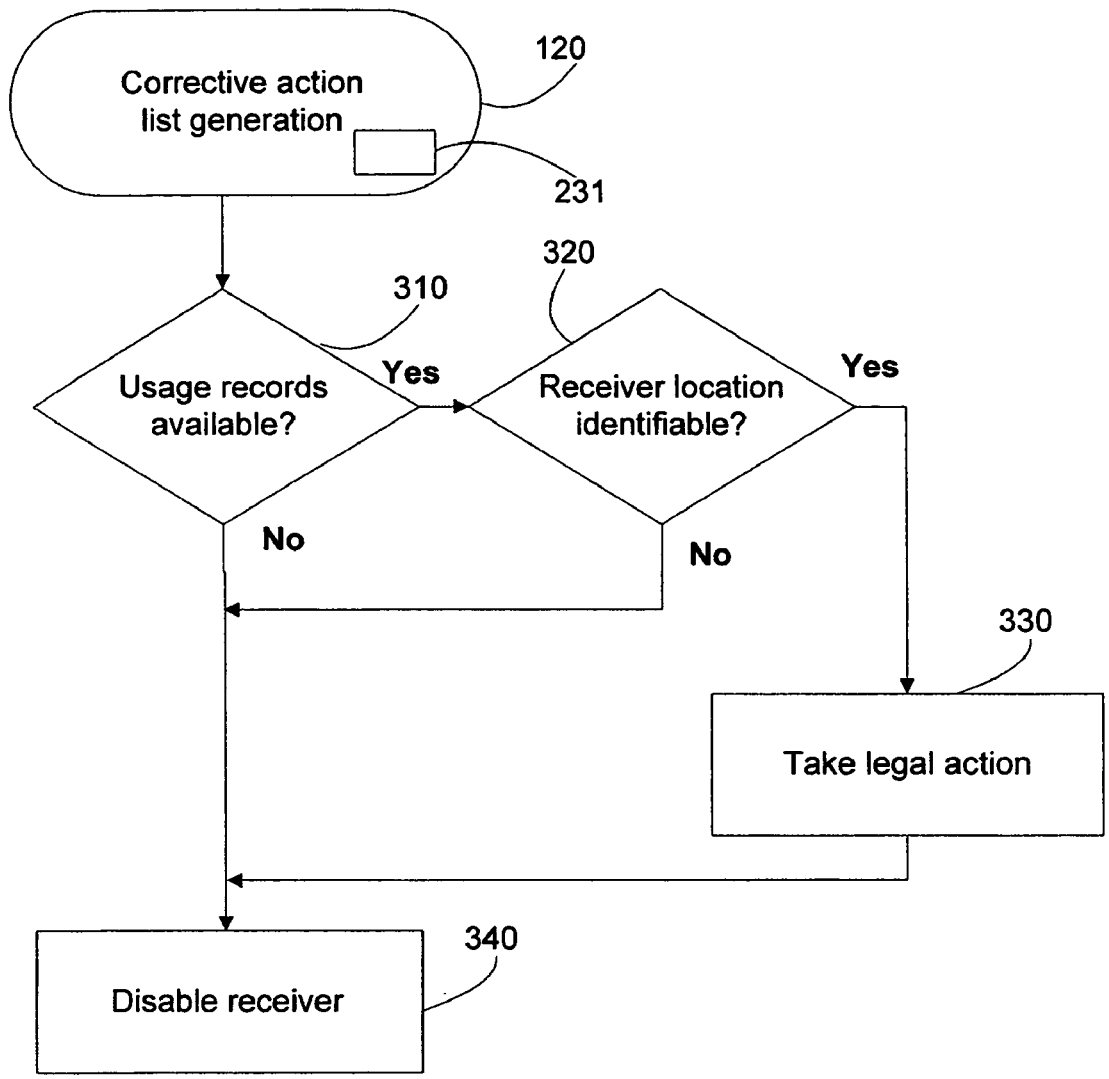
FIG. 6 is a flow diagram for taking corrective action for the method of FIG. 3 based on positive identification of unauthorized receiver usage.

By way of illustration, FIG. 6 provides a flowchart illustrating the corrective action list generation that may take place if usage records are a consideration. In this example, the operator of network 10 may disable one or more particular receivers 16, or may take legal action against the alleged user of the receivers 16 before disabling the one or more receivers 16.

After step 130 referred to in FIG. 3 is initiated, step 120 of FIG. 6 may be undertaken to generate a target receiver commands list 231 for taking one or more actions against a receiver 16. The receiver commands list 231 is described in greater detail below.

Referring to FIG. 6, in step 310 a determination is made of whether usage records are available. This could include any usage of a receiver 16, or indication of usage of one or more specific services at the receiver 16. If no such record is available, then step 340 generates a command for disabling the receiver 16. Disabling receiver 16 may, for example, merely be limited to disabling a functional capability of receiver 16, such as disabling access to a group of service or service offering of network 10, as described below. Of course, in some instances, disabling a functional capability of receiver 16 may include disabling the receiver 16 from any access to network 10.

If usage records are available to positively indicate unauthorized usage in step 310, then step 320 is taken to determine if the location of the receiver 16 can be identified. If the location cannot be identified, then step 340 generates a command for disabling the receiver 16. If within step 320 the location of the receiver 16 can be identified, then step 330 generates a command to take legal action against the alleged user of the receiver 16, and then step 340 is taken to generate a command to disable the receiver 16.

The target receiver action list 200 may take different forms, including:
- List of receivers 16 on which to take one or more technical, legal or other actions;
- Lists of commands to be manually entered on one or more systems;
- List of commands to be entered in batch, terminal emulation, operator emulation or other method in an automated manner; and
- List of receivers 16 and related authorization inconsistencies.

Based on the results of these further queries or analysis, the operator may choose different corrective actions. These could include and are not limited to:
- Disabling of one or more receiver 16 features or functions on one or more systems. Such features could include access to specific services or groups of services, such as channels, PPV, IPPV, iTV or others, within one or more systems such as CA 20, SMS 25, PPV, IPPV, iTV or other systems;
- Disabling one or more network features or functions or functions, such as addressable cable tap connections for the receiver 16;
- Attempting to identify the location of the receiver 16 using signal analysis, cable tracking, tap audits, prior subscription records or other methods;
- Correcting the values of the characteristics 100 within one or more systems to correspond to values expected for correctly authorized or correctly unauthorized receivers 16 for one or more services;
- Launching legal, civil or other claims, directly or through third parties, against alleged users of the unauthorized receivers 16; and
- Providing a list of the receivers 16 and inconsistencies found for such receivers 16 to one or more third parties such as, for example, the provider or providers of the systems containing the inconsistent characteristics 100. This option may be desirable for the network operator for several reasons, which could include a third party's unwillingness to allow operators to make particular types of direct corrections, the network operator not having staff with the required skill or training to make the corrections, or other reasons.

Once a target receiver list 200 has been generated, the operator of network 10 may optionally choose to take corrective action in an attempt to disable one or more capabilities, services or other function of a receiver 16 identified by the list 200, to disable such a receiver 16, to provide some form of advisory to the user that unauthorized usage is taking place at such receiver 16, or to identify the user or location of the receiver 16.

In one embodiment, the optional corrective action undertaking step 130 referred to in FIG. 3 may issue commands to disable one or more of the receivers 16 in the target list 200. For one or more receivers 16 in the target list 200, a set of one or more commands is created to disable the receiver 16. The resulting target receiver commands list 231 may be provided as one or more sets of commands to CA 20. One or more commands may be used for each receiver 16, and the format of each command and the resulting list will be based on identifiers for each receiver 16, the type of receiver 16, and the capabilities of the conditional access system 20. Where multiple receiver 16 types are supported, and multiple conditional access systems 20 are in use, the list of commands may be separated into separate lists for execution on each conditional access system 20 type. It will be appreciated that the format and selection of the commands, and the method for loading and executing the commands on the conditional access systems 20 may differ in different embodiments.

In one embodiment, the command selected for transmission to each receiver 16 could be a "cancel all services" command. Such a command would disable all services available to the receiver 16.

In another embodiment, the receiver or a subsystem or component of the receiver 16 may have been compromised in a manner that prevents one or more specific commands from executing on the receiver 16. In such cases, the commands that are prevented from executing may be those that are transmitted by SMS 25 to CA 20 for cancellation or disabling of services, of capabilities of the receiver 16, or the receiver 16 itself. The range of commands that SMS 25 is configured or programmed to send to CA 20 system may be a subset of the commands available to the CA 20 subsystem. In such cases, the commands used in the command list 231 may be selected specifically because they are different from those normally used by SMS 25.

In other embodiments, corrective action list generation step 120 will generate command list 231 with commands to disable a set of services, but not the entire receiver 16 or all services on the receiver 16. One or more commands may be used to disable such services. As some services are authorized in groups (sometimes referred to as packages), disabling a package containing one service could result in the viewer of a receiver 16 not receiving other services for which the viewer should be authorized that are contained in the same package. In such cases, a combination of service disabling commands and service enabling commands may be required to maintain the subscriptions for which the receiver 16 is legitimately authorized.

The appropriate commands to be generated in command list 231 may be dependent on the conditional access system 20 and receivers 16, or will be apparent to those of skill in the art.

The corrective actions that may be undertaken may consist of the disabling of means of communication to the receiver 16. In one embodiment, the connection of a cable to the home of a customer may be controlled by an addressable tap, which is a device that allows the physical cable connection to a receiver 16 be remotely disabled. The authorized list or the inventory list may be generated in a manner that includes information required to address the tap for the location in which receiver 16 is assumed to be located. The corrective actions may also query another system or combinations of systems such as SMS 25 or a system used to manage addressable taps to determine the information required to address the tap for a given receiver 16. The corrective action may then provide a list of addresses or a batch of commands to a tap management system or other system used to remotely control the taps to disable the taps related to the target receivers 16.

In other embodiments, the corrective action may consist of the issuing of a warning message to the user of a receiver 16 on the target list 200, separately or in combination with the disabling of a service, or a set of services on the receiver 16. The message may take the form of an on-screen message directed to one or more receivers 16 in the target list 200. Another method of presenting the message is to create a channel or other service that will be used and configured for communicating messages to one or more of the receivers 16 in the target list 200. Commands generated for one of more of the receivers 16 in the target list 200 will be selected to authorize the receivers 16 for the service. Messages may direct the user of the receiver 16 to take certain steps such as contacting the operator or a proxy for the operator to aid in identification of the user or in recovery of the receiver 16.

In still other embodiments, corrective action command list 231 may take different measures to disable the receiver 16. These may include and are not limited to:
- Disabling one or more capabilities of the receiver 16, or the entire receiver 16;
- Displaying a message to the user of the receiver 16;
- Reporting the unauthorized usage event to another network component or system;
- Generating a report identifying the receiver 16 and any inconsistency characteristics 100 showing receiver 16 as capable of engaging in unauthorized usage in network 10; and
- Reporting the unauthorized usage event to a conditional access system 20 component within, peripheral to, or external to the receiver 16.

It will be appreciated that other measures may be undertaken in other embodiments as will be available based on particular receiver 16 and conditional access system 20 implementations.

Further still in other embodiments, the corrective action command list 231 may optimize the target receiver commands based on the capabilities of conditional access system 20 to reduce the number or commands or the bandwidth used by the commands. These optimizations may include various methods of directing a single command to multiple receivers 16, and may be dependent on the type of CA system use, as known to those of skill in the art.

Referring to FIG. 3, the corrective action undertaking step 130 can occur in either automated or manual ways. The volume and timing of corrective actions may be controlled to prevent interference with other network operations in network 10.

For example, in one embodiment corrective action undertaking step 130 may be done on CA 20 and may require a level of flow control to ensure that the execution and transmission of commands to the receivers 16 does not impede the operation of the conditional access system 20 and network or other services on network 10. Measures may include, but are not limited to:
- Creation of a set of smaller batches for separate execution;
- Creation of instructions on when to issue the full list or batches from the list;
- Automatic scheduling of the full list or batches from the list;
- Limiting of the number of commands issued within a given time period;
- Limiting the rate at which commands are issued to the system; and
- Limiting the times and days on which commands are issued.

Services that may be affected on network 10 include network message volumes from a variety of systems and services, such as pay-per-view services and receiver 16 authorization traffic; the volume of calls to the network operator's customer support center, which may see an increased work volume when receivers 16 are being cancelled as described above.

In another example of taking corrective action, CA 20, SMS 25, CS 11 or other systems used to undertake corrective actions step 130 may not provide an interface for batch issuing of commands. In such a case, a computer can be used to connect to a terminal, network or other interface available on network 10. The computer may emulate the actions of a human operator by reading prompts and issuing commands based on the prompts. Programmable interfaces to terminal emulators can be used, or test tools that simulate user interaction with a graphical user interface may also be used. Other methods of emulating a user through a computer system's user interfaces are known to those of skill in the art.

Other interfaces or methods may be used to undertake corrective action. They may include, but are not limited to:
- Batch command interfaces;
- Programming or data interfaces, either directly on the same system or through network connections;
- Direct access to data stores such as files and databases;
- Providing the list of receivers 16 and authorization inconsistencies or corrective actions to one or more third parties such as one or more of the providers of the affected systems; and
- Where action is to be taken against the user of a receiver 16, providing appropriate information on the user and activity to lawyers, paralegals, bailiffs or other agents to take appropriate actions against the user.

As described herein, the identification of a receiver 16 within the target list 200 may be considered sufficient to warrant taking civil, legal or other action against the user of the receiver 16 based on violation of user agreements, contracts, local, state, provincial, national, international or other forms laws or regulations governing the use of the receiver 16. As an example, in the embodiments described above, the usage information from a receiver 16 may be considered as evidence that a user was accessing a given signal without authorization.

In some embodiments, network 10 is a cable television distribution network, with set-top box television receivers 16. Other embodiments of the invention may be useful in other receivers 16 and networks 10 such as:
- Television distribution networks, whether wired or wireless, or analog or digital, such as cable television, multipoint multichannel distribution system (MMDS) microwave, terrestrial broadcast, switched networks such as high-speed digital subscriber loop (DSL) and fibre-optic based networks;
- Switched and broadcast networks for distribution of other forms of audio, video, data, games, software or other forms of digital content, including cellular telephone networks, gaming networks for video games, digital radio networks, the Internet, and others;
- Receiving devices such as cellular telephones, personal digital assistants (PDAs), cable or DSL modems, personal computers, home entertainment systems, video game consoles, televisions with built-in receivers, and other devices. The devices may be designed for real-time playback, for downloading of content for subsequent playback, or for both; and Services and related systems from which receivers may receive services and which may contain receiver characteristics may include communication storage systems such as voice mail, e-mail or other systems; music, video or other content access systems; telephony, instant messaging, push-to-talk, text messaging or other one-way, two-way, one-to-many or many-to-many communications systems; data, application or other service access such as the Internet or services to allow access to the Internet or other networks.

The embodiments described above may be deployed in conjunction with various subscriber receiving devices such as television set-top boxes, television and audio receivers, personal computers or personal digital assistants, mobile telephone handsets or other handheld communication devices and the like. Moreover, the embodiments may be used to detect unauthorized signal usage in relation to numerous categories of deliverable content in a network 10, whether in the form of voice, video, sound, executable applications, data or the like, including any combinations thereof.

It will be appreciated from the above examples that a myriad of components and methods may be used to implement embodiments of the present invention. Although the invention has been described with reference to certain specific embodiments, various modifications thereof will be apparent to those skilled in the art without departing from the spirit and scope of the invention as outlined in the claims appended hereto.

I claim:

1. A method for auditing unauthorized signal usage in a subscriber content delivery network, the method comprising the steps of:
   a) obtaining an indicator relating to accessibility in respect of a receiver capable of receiving and processing signals containing subscriber content in the form of a predetermined service offering of said network for consumption by a subscriber over said network and through said receiver, wherein said indicator relating to accessibility is indicative of whether said predetermined service offering is physically accessible to said receiver regardless of whether said predetermined service offering is authorized to be made available to said receiver
   b) obtaining an indicator relating to authorization for said pre-determined service offering, wherein said indicator relating to authorization is indicative of whether said predetermined service offering is authorized to be made available to said receiver;
   c) comparing said obtained indicator relating to accessibility to said obtained indicator relating to authorization;
   d) determining whether said indicator relating to accessibility is inconsistent with said indicator relating to authorization to thereby ascertain that the receiver is capable of engaging in unauthorized usage in respect of said predetermined service offering; and
   e) wherein at least one of said indicator relating to accessibility and said indicator relating to authorization is not used by a conditional access system associated with the subscriber content delivery network, and wherein the conditional access system controls subscriber access to said predetermined service offering of said content delivery network.

2. The method of claim 1, wherein said indicator relating to accessibility is evidence that said receiver has been procured by a network operator of said network, and said indicator relating to authorization is evidence that said receiver is not authorized for usage of said pre-determined service offering of said network.

3. The method of claim 2, wherein said evidence that said receiver is not authorized is an absence of indicia that said receiver is authorized for usage of said predetermined service offering of said network.

4. The method of claim 2, wherein said evidence that said receiver is not authorized is obtained from a subscriber management system controlling access of said receiver to receive said signals through said network.

5. The method of claim 2, wherein said evidence that said receiver is not authorized is obtained with a conditional access system controlling access of said receiver to receive said signals through said network.

6. The method of claim 2, wherein said evidence that said receiver is not authorized is obtained from any one of a video-on-demand service, a pay-per-view service, an impulse pay-per-view service, an advertising management service, a software download system and an interactive television system.

7. The method of claim 1, wherein said indicator relating to accessibility is evidence that said receiver is connected to said network, and said indicator relating to authorization is evidence that said receiver is not authorized for usage of said predetermined service offering of said network.

8. The method of claim 7, wherein said evidence that said receiver is connected to said network includes an indication of said receiver responding to a transmission through said network.

9. The method of claim 7, wherein said evidence that said receiver is not authorized is an absence of indicia that said receiver is authorized for usage of said predetermined service offering of said network.

10. The method of claim 7, wherein said evidence that said receiver is not authorized is obtained from a subscriber management system controlling access of said receiver to receive said signals through said network.

11. The method of claim 7, wherein said evidence that said receiver is not authorized is obtained from said conditional access system.

12. The method of claim 7, wherein at least one of said evidence that said receiver is connected to said network and said evidence that said receiver is not authorized is obtained from any one of a video-on-demand service, a pay-per-view service, an impulse pay-per-view service, and an interactive television system.

13. The method of claim 1, wherein said indicator relating to accessibility is evidence that said receiver is using a signal through said network associated with said predetermined service offering, and said indicator relating to authorization is evidence that said receiver is not authorized for usage of said predetermined service offering of said network.

14. The method of claim 13, wherein said evidence that said receiver is using a signal through said network includes an indication of communication between said receiver and a network server offering said predetermined service offering to subscribers of said network.

15. The method of claim 13, wherein said evidence that said receiver is not authorized is an absence of indicia that said receiver is authorized for usage of said predetermined service offering of said network.

16. The method of claim 13, wherein said evidence that said receiver is not authorized is obtained from a subscriber management system controlling access of said receiver to receive said signals through said network.

17. The method of claim 13, wherein said evidence that said receiver is not authorized is obtained from said conditional access system.

18. The method of claim 13, wherein at least one of said evidence that said receiver is connected to said network and said evidence that said receiver is not authorized is obtained from any one of a video-on-demand service, a pay-per-view service, an impulse pay-per-view service, an advertising management service, a software download system, and an interactive television system.

19. The method of claim 1, wherein if said indicator relating to accessibility is inconsistent with said indicator relating to authorization, a corrective action is executed to address the inconsistency between said indicator relating to accessibility and said indicator relating to authorization.

20. The method of claim 19, wherein
each of said indicator relating to accessibility and said indicator relating to authorization is retrieved from a record of any one of, a subscriber management system in communication with said network, a video-on-demand system in communication with said network, a pay-per-view system in communication with said network, an impulse pay-per-view system in communication with said network, and an interactive television system in communication with said network, and
said corrective action updates said record to cause said indicator relating to accessibility to be consistent with said indicator relating to authorization.

21. The method of claim 19, wherein said corrective action includes disabling at least one functional capability of said receiver.

22. The method of claim 19, wherein said corrective action includes launching a legal action against any alleged user of said receiver.

23. The method of claim 19, wherein said corrective action is executed in an automated manner.

24. The method of claim 19, wherein said corrective action is executed at a time tending to minimize disruption of operation of said network.

25. The method of claim 19, wherein said corrective action includes recording into a report information identifying: a) said receiver, b) said indicator relating to accessibility and c) said indicator relating to authorization.

26. The method of claim 25, wherein said report is utilized to take at least one further corrective action.

27. The method of claim 26, wherein said using said report is performed by a party other than the party which performed said recording into said report.

28. The method of claim 1, wherein the step of obtaining an indicator relating to accessibility is performed for a first plurality of said receivers that share a predetermined said indicator relating to accessibility to produce an inventory list of said receivers, wherein the step of obtaining an indicator relating to authorization is preformed for a second plurality of said receivers that share a predetermined said indicator relating to authorization to produce an authorized list of said receivers, and wherein the step of determining whether said indicator relating to accessibility is inconsistent with said indicator relating to authorization includes the step of producing a target receiver list consisting of receivers on the inventory list that are not on the authorization list.

29. A method for detecting unauthorized signal receivers in a subscriber content delivery network, comprising the steps of:
a) identifying receivers that are capable of physically accessing and processing a subscriber signal containing subscriber content in the form of a predetermined service offering of said network, delivered by said network for consumption by a subscriber over said network and through said receiver regardless of whether said predetermined service offering is authorized to be made available to said receiver
b) identifying receivers that are authorized to receive said predetermined service offering delivered by said network; and
c) wherein at least one of said step of identifying receivers that are capable of physically accessing and processing the said predetermined service offering and said step of identifying receivers that are authorized to receive the said predetermined service offering are not performed using information obtained from a conditional access system associated with the subscriber content delivery network, and wherein the conditional access system controls subscriber access to said predetermined service offering of said network, and wherein when each of said receivers identified in step a) is not one of said receivers identified in step b), further identifying each of said receivers as being a potentially unauthorized signal receiver.

30. The method of claim 29, further comprising:
d) disabling said each of said receivers from receiving the predetermined service offering delivered by said network.

31. The method of claim 30, wherein
a conditional access system is in communication with said network and said each of said receivers,
access by said each of said receivers to the predetermined service offering delivered by said network is controlled by said conditional access system, and
said disabling said each of said receivers include said conditional access system refusing further access by said each of said receivers to the predetermined service offering in response to said each of said receivers being identified as being a potentially unauthorized signal receiver.

32. The method of claim 30, wherein said disabling said each of said receivers include at least one command being sent over said network to said each of said receivers to disable at least one capability of said each of said receivers.

33. The method of claim 30, further comprising:
e) taking legal action against at least one alleged user of said each of said receivers.

34. The method of claim 29, wherein said step of identifying receivers that are capable of physically accessing and processing the subscriber signal includes identifying receivers which have previously been authorized and subsequently de-authorized for receiving said subscriber signal delivered by said network.

35. The method of claim 29, wherein said step of identifying receivers that are capable of physically accessing and processing the subscriber signal includes identifying receivers having records associated therewith indicating use at said receivers of said predetermined service offering.

36. The method of claim 29, wherein said identifying receivers that are capable of physically accessing and processing subscriber signal include identifying receivers having records associated therewith indicating that payment was made by users of said receivers to obtain authorization for use at said receivers of said predetermined service offering.

37. The method according to claim 29, wherein the step of identifying end-user receivers that are capable of accessing and processing the predetermined service offering comprises the compilation of an inventory list of receivers that share a predetermined indicator relating to accessibility
wherein the step of identifying receivers that are authorized to receiver the predetermined service offering comprises the compilation of an authorization list of receivers that share a predetermined indicator relating to authorization;

and wherein the step of further identifying each of the receivers as being a potentially unauthorized signal receiver comprises the compilation of a target receiver list consisting of said receivers identified in step (a) that are not receivers identified in step (b).

38. A method for auditing unauthorized signal usage in a subscriber content delivery network, the method comprising the steps of:
(a) obtaining, from a first information system associated with the subscriber content delivery network, at least one of a first indicator relating to accessibility and a first indicator relating to authorization;
(b) obtaining, from a second information system associated with the subscriber content delivery network, at least one of a second indicator relating to accessibility and a second indicator relating to authorization;
wherein the first and second indicators relating to accessibility are in respect of a receiver capable of receiving and processing signals containing subscriber content in the form of a predetermined service offering of said network for consumption by a subscriber over said network and through said receiver, the first and second indicators relating to accessibility being indicative of whether said predetermined service offering that is physically accessible to said receiver regardless of whether said predetermined service offering is authorized to be made available to said receiver, and wherein the first and second indicators relating to authorization are in respect of said predetermined service offering of said network, the first and second indicators relating to authorization being indicative of whether said predetermined service offering is authorized to be made available to said receiver;
(c) comparing each of said at least one first indicators to each of said at least one second indicators;
(d) determining whether any of said at least one first indicators is inconsistent with any of said at least one second indicators to thereby ascertain that the receiver is capable of engaging in an unauthorized signal usage in respect of said predetermined service offering; and
(e) wherein at least one of said first information system and said second information system is not a conditional access system associated with the subscriber content delivery network, and wherein the conditional access system controls for controlling subscriber access to said predetermined service offering for said network.

39. The method according to claim 38, wherein said first and second information systems are selected from the group consisting of: a system containing records of network activity for the said receiver, a system containing records of access attempts to subscriber content for the said receiver, a system containing records of permissions for subscriber content access for the said receiver, and a system containing records of network access permissions for the said receiver.

40. The method of claim 38, wherein the first and second information systems are selected from the group consisting of: a subscriber management system, a video-on-demand system, a pay-per-view service, an impulse pay-per-view service, an advertising management service, a software download system and an interactive television system.

41. The method according to claim 38, wherein the step of obtaining at least one of a first indicator relating to accessibility and a first indicator relating to authorization is preformed for a first plurality of said receivers that share a predetermined said at least one of said first indicators to produce a first list of said receivers;
wherein the step of obtaining at lest one of a second indicator relating to accessibility and a second indicator relating to authorization is preformed for a second plurality of said receivers that share a predetermined said at least one of said second indicators to produce a second list of said receivers;
and wherein said step of determining whether any of said at least one first indicators is inconsistent with any of said at least one second indicators is performed by comparing receivers on the first list with receivers on the second list to produce a target receiver list consisting of receivers that are not on both the first list and the second list.

* * * * *